June 11, 1968 L. H. FLORA 3,387,529

SLIDE-TYPE FASTENING DEVICE

Filed Sept. 23, 1966 3 Sheets-Sheet 1

INVENTOR
LAURENCE H. FLORA

BY

Teare, Teare & Sammon

ATTORNEYS

SLIDE-TYPE FASTENING DEVICE

Filed Sept. 23, 1966 3 Sheets-Sheet 2

INVENTOR
LAURENCE H. FLORA
BY
Teare, Teare & Sammon
ATTORNEYS

INVENTOR
LAURENCE H. FLORA

BY

Teare, Teare & Sammon
ATTORNEYS

United States Patent Office 3,387,529

Patented June 11, 1968

3,387,529

SLIDE-TYPE FASTENING DEVICE

Laurence H. Flora, North Olmsted, Ohio, assignor to Tinnerman Products, Inc., Cleveland, Ohio, a corporation of Ohio Filed Sept. 23, 1966, Ser. No. 581,640

29 Claims. (Cl. 85—36)

ABSTRACT OF THE DISCLOSURE

A slide-type fastener for securement with a stud comprising a support-like base member and a resilient locking member adapted for detachable connection with the base member. The base member is provided with an opening for receipt of the stud and with a pair of shoulder portions on opposite sides of the opening which curve in a lengthwise direction outwardly and upwardly away from the opening. The body of the locking member is provided with a lengthwise extending slot. A pair of oppositely disposed resilient arms extend laterally outwardly from the body for snap-fastening and sliding and retaining engagement with the shoulder portions.

This invention relates to fastening devices and more particularly relates to a novel construction for a two-piece slide-type fastening device for use in assembly with mounting members, such as studs or the like.

Heretofore, various types of clamp and slide-type fasteners have been employed in place of threaded nuts and/or bolts arrangements. Generally, such devices have included slotted metal fasteners which when slid into engagement with a stud are placed under tension for gripping the stud. It has been found, however, that such heretofore known devices are not satisfactory for a number of reasons. Common experience has indicated that where rusting occurs, such devices are extremely difficult to remove without damage and/or actual breakage; are reusable to only a limited extent; and exhibit an appreciably reduced holding power, particularly after repeated usage. Furthermore, such devices have not been effective to provide an adequate seal between the parts so as to prevent entry of dust, dirt, moisture or the like between the parts. In addition, such devices do not provide a mar-free contact with the parts, such as with a support panel, and fail to provide a satisfactory vibration dampening under many conditions, such as continuous vibration or a jolting as exists in the automotive industry.

Accordingly, objects of the present invention are to provide a novel construction of a two-piece fastening device which comprises a resilient metal locking member and a ramped, polymeric shoe-like base member which slidably coact for tightly locking and gripping a stud or the like on assembly; which is simple and economical to produce; which is quick and easy to assemble and remove; which incorporates an effective holding power, yet which enables repeated removal and reuse without loss of holding power; which provides an effective sealing action between the parts to prevent entry of dirt, dust, moisture or the like between the parts; and which provides vibration dampening and mar-free contact with the supporting members, such as a panel or the like.

Other objects and advantages of the invention will be apparent from the following description taken in conjunction with the accompanying drawings, wherein:

FIG. 5 is a generally perspective view on a reduced scale showing the manner in which the resilient metal locking member is slid into engagement with a stud or the like;

FIG. 6 is an enlarged side elevation view showing the fastening device in assembled position with a stud or the like;

FIG. 7 is a side elevation view on a reduced scale showing the manner of removal of the resilient metal locking member from engaged gripping relation with a stud or the like;

FIG. 12 is a side elevation view showing the fastening device of FIGS. 8 through 11 in assembled position with a stud or the like;

FIG. 17 is a side elevation view showing the fastening device of FIGS. 13 through 16 mounted in assembled relation with a stud or the like;

Figure 6:
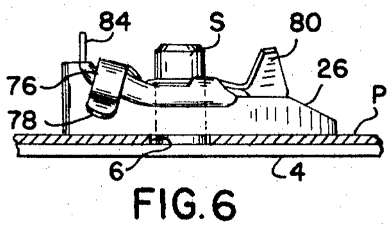
Figure 8:
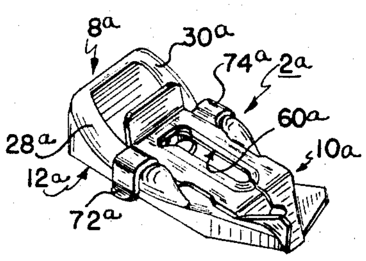
FIG. 8 is a generally perspective view showing a modification of the fastening device made in accordance with the invention.
Figure 9:
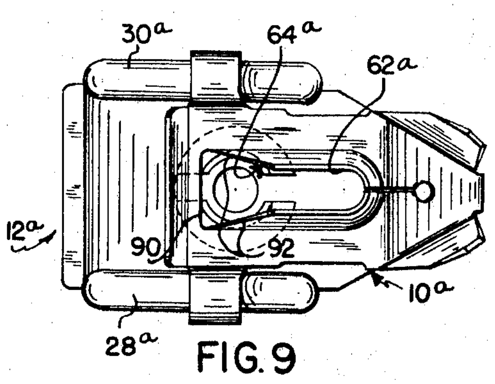
FIG. 9 is an enlarged top plan view of the fastening device of FIG. 8.
Figure 10:
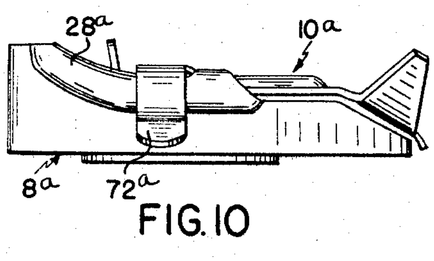
FIG. 10 is a side elevation view of the fastening device of FIG. 9.
Figure 11:
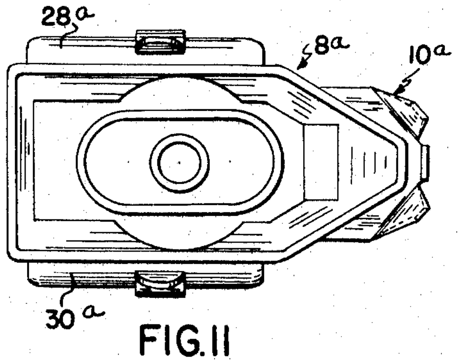
FIG. 11 is a bottom view of the fastening device of FIG. 9.
Figure 12:
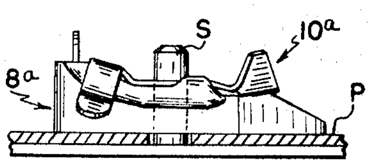
Figure 13:
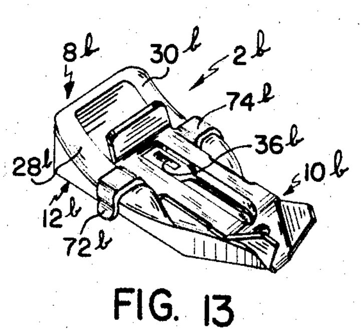
FIG. 13 is a generally perspective view of another modification of the fastening device of the invention.
Figure 14:
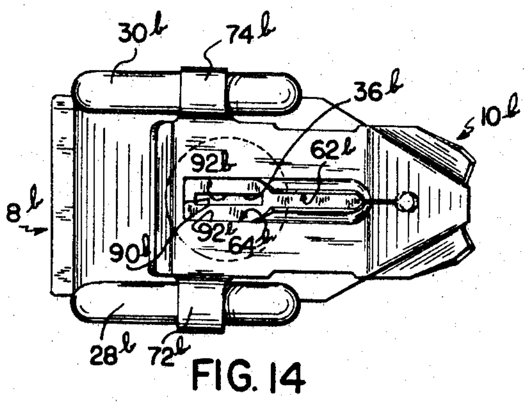
FIG. 14 is a top plan view of the fastening device of FIG. 13.
Figure 15:
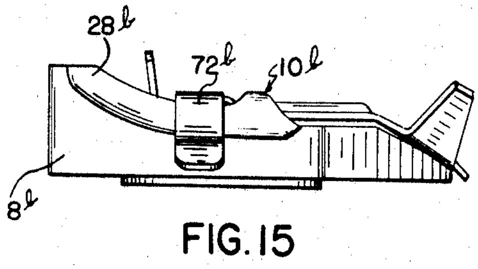
FIG. 15 is a side elevation view of the fastening device of FIG. 14.

Referring now again to the drawings and in general to FIG. 6, thereof, the fastening device, designated generally at 2, is shown in one embodiment for securement onto a threadless member S such as a stud or the like, which may have an integral head 4 for attachment to an apertured support panel P.

As shown, the device 2 is of a two-piece construction including a base member 8 and a detachable locking member 10. The base member 8 is preferably made of polymeric material, such as polyethylene, nylon or the like, and includes a shoe-like body 12 having a pair of vertical, generally parallel side edges 14 (FIG. 2) and a vertical end edge 16. The side edges 14 taper convergently toward one another, as at 18, so as to merge into a vertical end edge 20 (FIG. 3) to provide the generally truncated shape shown.

Figure 1:
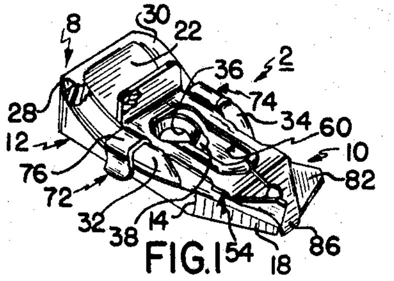
FIG. 1 is a perspective view of one embodiment of the fastening device showing the resilient metal locking member mounted for sliding coaction on the polymeric shoe-like base member.
Figure 3:
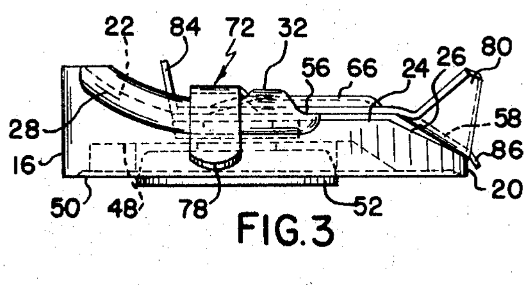
FIG. 3 is a side elevation view of the fastening device of FIG. 2.

The upper surface of the body 12 may include a first section 22 which smoothly curves, such as convexly, from the end edge 16 and which terminates at substantially the mid-portion of the body. A planar section 24 extends in a direction away from the curved section 22, and an inclined planar section 26 extends downwardly in a direction toward the other end edge 20, as best seen in FIGS. 1 and 3.

Figure 2:
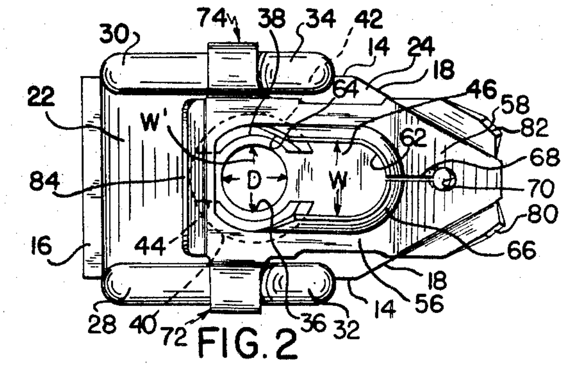
FIG. 2 is an enlarged top plan view of the fastening device of FIG. 1.

A pair of spaced, oppositely disposed generally parallel shoulders 28 and 30 are made integral with and extend upwardly from the body 12 which coact to provide a trackway for sliding movement of the locking member 10 thereon. As shown, the shoulders 28 and 30 are substantially coextensive in length with the curved section 22 so as to be similarly curved, such as convexly, in side elevation. The shoulders are also preferably curved, such as convexly, in transverse cross section to provide a smooth, sliding coaction with the locking member 10. Preferably, the shoulders are of a width so as to extend laterally outwardly beyond the respective side edges 14 of the body 12, as best seen in FIG. 2.

The shoulders 28 and 30 are provided at one end with integral, upstanding lugs 32 and 34 which operate to provide an abutment means for limiting sliding movement of the locking member 10 with respect to the body 12 in one direction during operation thereof.

The body 12 is preferably provided with a centrally disposed opening 36 adapted to receive the stud S.

The opening 36 is defined by closed web 38 which in the form shown preferably has a circular shape. The web 38 is defined at one end by a pair of oppositely disposed, arcuate recess openings 40 and 42 located on opposite sides thereof, and which extend only partially through the material of the body 12. A pair of oppositely disposed pintle-like portions 44 and 46 (FIG. 2) are made integral with the body 12 and the web 38 intermediate the recessed openings 40 and 42. By this arrangement, the web 38 is given a resilient-flexure capability with respect to the central axis of the opening 36 to facilitate assembly with and to provide a tight sealing engagement with the stud S.

To provide a tight sealing engagement with the stud S, the interior surface of the web 38 is preferably tapered divergently in a direction away from the upper surface of the body 12. Preferably, the maximum inside transverse dimension (diameter) of the opening 36 adjacent its upper end D (FIG. 2) is substantially the same as or slightly smaller than the maximum transverse dimension of the stud S; while the dimension at the lower end D' (FIG. 4) is substantially greater than the maximum transverse dimension of the stud. By this arrangement, as the stud is inserted through the opening 36, the web exerts a progressively increased, frictional engagement thereon to provide an initial holding thereof and to provide an additional gripping power on the stud, as will hereinafter be more fully described.

In the form shown, the bottom surface of the body 12 is generally flat and is formed with a depressed cavity, as at 48, which has a shape corresponding generally to that of the body itself. This bottom surface is provided with an endless flange 50 which extends completely around the peripheral margin of the body 12. By this arrangement, the flange 50 provides an outer seal for engagement against the confronting surface of the support panel P, thereby to prevent the entry of dust, dirt, moisture and the like through the aperture 6 therein.

The transverse thickness of the body 12 including the flange 50 is sufficiently flexible to provide the desired sealing characteristics in the assembled position thereof.

Figure 4:
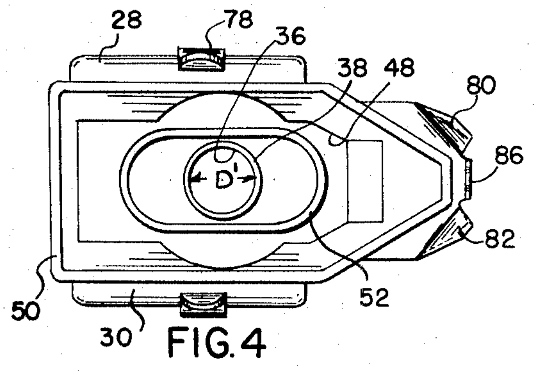
FIG. 4 is a bottom view of the fastening device of FIG. 2.

As best seen in FIGS. 3 and 4, a resilient, deformable skirt 52 is made integral with and depends downwardly from the body 12 and in encompassing relation with respect to the opening 36 therein. In the form shown, the skirt 52 is preferably of an oval shape and extends a predetermined distance, such as .015 inch plus or minus .01 inch, below the flange 50 so as to provide an effective inner seal against the confronting surface of the support panel P and for the purposes, as aforesaid. The wall thickness of the skirt 52 is substantially less than the wall thickness of the flange 50 so as to be readily compressed against the support panel P in the final assembled position of the device.

The locking member 10 in the form shown includes an elongated body 54 which may be formed of a piece of flexible metal material, such as spring steel or the like. The body 54 includes a generally flat section 56 and an inclined planar section 58 bent downwardly so as to conform generally to the contour of the inclined section 26 of the base member 8. The section 56 preferably has a key-hole shaped slot 60 (FIG. 1) extending longitudinally thereof and defined by a reduced width neck portion 62 (FIG. 2) which opens onto an enlarged annular portion 64. The neck portion 62 includes a crimped marginal edge 66 which affords a tight gripping and biting engagement with the stud S. Preferably, the width W (FIG. 2) of the neck portion 62 is substantially the same size or slightly smaller than the maximum transverse dimension (diameter) of the stud; while the maximum transverse width W' of the annular portion 64 is slightly greater than this dimension of the stud to facilitate initial insertion thereof. The neck portion 62 is provided at one end with a radial slit 68 which opens into an aperture 70 provided in the inclined section 58 to provide limited lateral expansion of the neck portion 62 after insertion of the stud.

To provide for ready detachment and sliding coaction on the base member 8, the body 54 of the locking member 10 is preferably provided with a pair of oppositely disposed resilient legs 72 and 74 which are adapted to fit over and around the respective shoulders 28 and 30 on the base member 8. The legs are of an identical construction, each of which may include a generally U-shaped portion 76 (FIG. 1) and a downwardly and outwardly extending finger portion 78 (FIG. 3) which facilitates snap-fastening engagement and/or removal of the respective legs from the respective shoulders 28 and 30.

The body 54 of the locking member 10 is preferably of a width sufficient to be slidable, yet snugly received intermediate the shoulders 28 and 30 on the base member 8. As seen in FIG. 3, the length of the body 54 is sufficient so that the inclined section 58 is disposed in generally aligned relation over the corresponding inclined section 26 of the base member 8 when the legs 72 and 74 are in abutting engagement with the lugs 32 and 34 provided on the shoulders 28 and 30.

Figure 5:
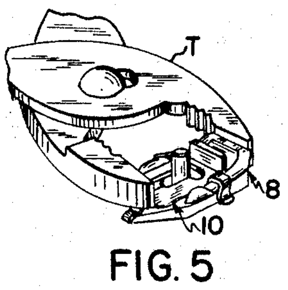

The body 54 is preferably provided at one end with a pair of spaced, oppositely disposed wings or tangs 80 and 82 which extend upwardly from the inclined section 58 and which are adapted for engagement by a suitable tool T, such as the pliers of FIG. 5, for slidably moving the locking member 10 into secured relation on the stud S. At the other end, the body 54 is preferably provided with a flange 84 which extends upwardly at right angles therefrom and which is adapted to be engaged by the tool T for removal of the locking member 10.

As best seen in FIGS. 1, 3 and 4, a trailing cam-like finger element 86 is made integral with and extends downwardly from the inclined section 58 and between the tangs 80 and 82. In the normal assembled position as shown in FIG. 3, the finger element 86 projects down and over the end edge 20 of the base member 8 so as to cooperate with the resilient legs 72 and 74 for holding the parts in assembled relation. In operation thereof, for securement to the stud S, the element 86 cams up on the inclined section 26 of the base member 8 to provide a firm, uniform take-up on the stud.

In a typical application, the locking member 10 may be mounted on the base member 8 simply by snapping the resilient legs 72 and 74 over and around the respective shoulders 28 and 30 provided on the base member 8. Thus mounted, the legs 72 and 74 are disposed in engaged relation with the lugs 32 and 34 so that the enlarged portion 64 of the slot 60 is in registration over the opening 36 in the base member 8. The base member 8 and the locking member 10 may then be pressed downwardly, as a unit, so that the stud S is received through the opening 36 and the enlarged portion 64 of the slot 60. In this position, the confronting interior surface of the resilient web 38 firmly grips the stud for initial holding thereof. The tool T is then applied against the end edge 16 of the base member 8 and against the tangs 80 and 82 so as to slidably force the locking member 10 forwardly along the curved surface of section 22. This action moves the crimped marginal edge 66 of the neck portion 64 of the slot 60 into surface-to-surface gripping and/or biting engagement with the stud S.

As the locking member 10 is moved to the left for progressively gripping the stud, as shown in FIG. 6, the inclined section 58 and trailing finger element 86 cam-up on the confronting inclined section 26 of the base member 8 so that the locking member 10 is drawn-up on the stud. This draw or take-up on the stud may be approximately ⅛ of an inch dependent upon the size of the part. By this action, the locking member 10 is, in effect, pushed against the base member 8 which in turn tightly clamps the latter against the support panel P. The force exerted by the stud S on the marginal edges 66 of the slot 60 causes the body 54 of the locking member 10 to be drawn into a partially flattened condition against the resistance of the legs 72 and 74 to achieve the pushing action against the base member 8. In this position, lateral and longitudinal movement of the locking member 10 is prevented with respect to the base member 8. This conjunctive clamping action functions to compress the outer sealing flange 50 and the inner sealing skirt 52 into tight sealing engagement with the confronting side of the support panel P in the final assembled position of the device.

Figure 7:
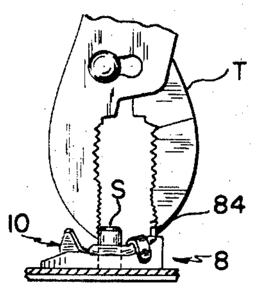

Removal of the device is accomplished simply by applying the tool T to the flange 84 and to the stud S so that the locking member 10 is slidably moved to the left (FIG. 7), whereupon, the device may be lifted-off the stud S for repeated use in another installation.

In FIGS. 8 to 12 there is shown a modification of the fastening device, designated generally at 2*a*, which is generally similar to the device shown in FIGS. 1 to 7 with the suffix "*a*" added to the reference numerals to designate like parts. In this form, the base member 8*a* is of a substantially identical construction including a shoe-like body 12*a* having a pair of oppositely disposed curved shoulders 28*a* and 30*a* which coact to provide a ramp-like trackway for engagement by the resilient legs 72*a* and 74*a* of the locking member 10*a*. In this form, however, the slot 60*a* (FIG. 8) in the locking member 10*a* is of a slightly different shape having an elongated reduced width neck portion 62*a* (FIG. 9) which opens into an enlarged width flared portion 64*a*. Moreover, in this form, the flared portion 64*a* is defined by a linear extending front edge 90 and a pair of spaced linearly extending side edges 92 which extend convergently in a direction away from the edge 90 to provide the key-hole shaped construction shown. Here again, the neck portion 62*a* is defined by a raised crimped marginal edge 66*a* to provide a gripping engagement with a stud or the like, as aforesaid.

Figure 16:
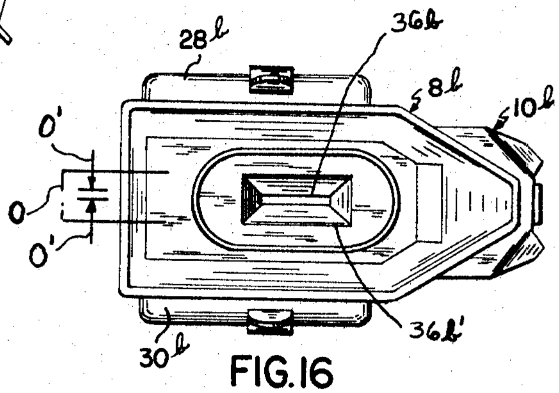
FIG. 16 is a bottom view of the fastening device of FIG. 14.
Figure 17:
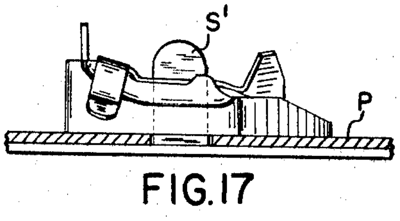
Figure 18:
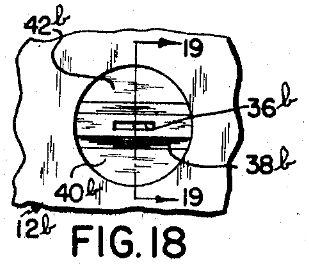
FIG. 18 is an enlarged fragmentary view showing the weblike construction of the polymeric base member with the resilient metal locking member removed for purposes of clarity.
Figure 19:
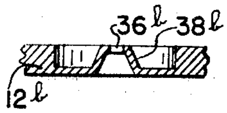
FIG. 19 is a fragmentary section view taken along the plane of the line 19—19 of FIG. 18.

In FIGS. 13 to 17 there is shown another modification of the fastening device, designated generally at 2*b*, which is generally similar to that shown in FIGS. 1 to 12 with the suffix "*b*" added to the reference numerals to designate like parts. In this form, however, the device has particularly useful application for securement on a polygonal, such as a flat rectangular shaped stud S′, of the type which has a head portion for attachment thereof to an apertured support panel P, as seen in FIG. 17. Accordingly, in this form, the shoe-like body 12*b* of the base member 8*b* includes a pair of oppositely disposed shoulders 28*b* and 30*b* which coact to provide a ramp-like trackway for movement of the resilient legs 72*b* and 74*b* of the locking member 10*b* thereon. In this form, however, the opening 36*b* in the base member 8*b* for receiving a stud is preferably of a polygonal, such as a rectangular shape defined by an elongated, generally inverted U-shaped resilient web 38*b* (FIG. 19). The web 38*b* is formed from the material of the body 12*b* and is defined by a pair of oppositely disposed generally semi-circular recessed portions 40*b* and 42*b* (FIG. 18) which are disposed on opposite sides thereof and which extend only partially through the material of the body 12*b*. Here again, the interior surface of the web 38*b* diverges in a direction away from the upper surface of the body 12*b* so that the width O′ of the opening 36*b* on the upper surface of the body 12*b* is substantially less than the width O of the opening 36*b*′ on the underside of the body, as best seen in FIGS. 16 and 18. By this arrangement, the base member 8*b* can readily be pressed onto a polygonal shaped stud, whereupon the web 38*b* provides a tight gripping engagement with the stud to provide an effective initial support and seal therefor.

In this form, the locking member 10*b* is substantially similar in construction as that shown in FIGS. 1 to 12, except that the slot for receiving and gripping the stud includes an elongated reduced width neck portion 62*b* which opens into an enlarged width polygonal portion 64*b*. The enlarged portion 64*b*, however, is defined by a linear front edge 90*b* and a pair of oppositely disposed parallel side edges 92*b* which extend at right angles from the front edge 90*b*.

Accordingly, it can be seen that in the present invention the resilient web as well as the opening through the web may be of various sizes and/or shapes in accordance with the invention to provide a resilient sealing coacting engagement with a stud received through the ramp-like base member. Similarly, it will be seen that the slot in the resilient locking member may be of various sizes and/or shapes in accordance with the invention to provide an effective gripping engagement on a stud received therethrough upon relative sliding movement of the locking member on the ramp-like surface provided by the base member. It is also to be understood, however, that although the sealing flanges 50 and 52 in the embodiments shown have been illustrated as being of a particular shape they may also be of other various shapes, such as polygonal, circular or the like, in accordance with the invention so as to provide an adequate seal around the aperture in the support panel.

From the foregoing description and accompanying drawings, it will be seen that the invention provides a novel fastening principle which combines a metallic resilient locking member and a ramped, polymeric shoe-like base member on which the locking member slides which coact to draw a stud or the like tight on assembly, yet which permits repeated removal and re-use of the device without loss of holding power. The assembly of the device is fast and simple and the physical characteristics of the polymeric shoe-like base member provides vibration dampening and mar-free contact with a support panel or the like during the use thereof.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. A fastening device for securement with a stud or the like comprising, a base member having an opening for receiving a stud therethrough, a resilient locking member having a slot therein, and retainer means on one of the members adapted for mounting said locking member on said base member, said opening in said base member being defined by an integral web having at least one side wall for gripping engagement with a stud received therein, said web being integrally connected to said base member by pintle-like portions for resilient pivotal movement upon engagement of said web by a stud inserted through said opening.

2. A fastening device for securement with a stud or the like comprising, a base member having an opening for receiving a stud therethrough, a resilient locking member having a slot therein, and retainer means on one of the members adapted for mounting said locking member on said base member, said opening in said base member being defined by an integral web having at least one side wall for gripping engagement with a stud received therein, said web being polygonal in transverse shape and including a plurality of side walls which extend divergently in a direction from the top toward the bottom of said base member.

3. A fastening device in accordance with claim 2, wherein said base member includes a pair of oppositely disposed shoulder portions which define guideways for sliding movement of said retainer means thereon.

4. A fastening device in accordance with claim 3, wherein said retainer means includes a pair of oppositely disposed resilient arms extending outwardly from said locking member, said arms being bent for gripping sliding engagement on said shoulder portions.

5. A fastening device in accordance with claim 4, wherein said shoulder portions each include lug means for limiting sliding movement of said arms in one direction.

6. A fastening device for securement with a stud or the like comprising, a base member having an opening for receiving a stud therethrough, a resilient locking member having a slot therein, a retainer means on one of the members adapted for mounting said locking member on said base member, said base member including a curved upper surface section adjacent one end for sliding coacting engagement with one end of said locking member, and an inclined surface section adjacent the other end for sliding coacting engagement with the other end of said locking member, said base member including a pair of elongated shoulder portions disposed on opposite sides of said curved surface section, said shoulder portions being curved in substantially the same longitudinal direction as said curved surface section, said retainer means including a pair of oppositely disposed resilient arms extending outwardly from said locking member and being bent for gripping sliding coacting engagement on said shoulder portions.

7. A fastening device in accordance with claim 6, wherein said slot is defined by an elongated reduced width portion which opens into an enlarged portion.

8. A fastening device in accordance with claim 6, wherein said web is circular in transverse shape and includes an endless side wall which extends divergently in a direction from the top toward the bottom of said base member.

9. A fastening device in accordance with claim 6, wherein said base member includes an integral, endless flange extending downwardly from the bottom side thereof, said flange being disposed completely around the peripheral marginal edge of said base member and adapted to provide a seal therefor.

10. A fastening device in accordance with claim 6, including an integral, endless resilient skirt portion extending downwardly from the bottom side of said base member, said skirt completely encompassing the opening in said base member and adapted to provide a seal therefor.

11. A fastening device in accordance with claim 6, wherein said locking member includes tang means at one end and flange means at the other end for engagement by a work tool.

12. A fastening device in accordance with claim 6, wherein said base member is comprised of a polymeric material, and wherein said locking member is comprised of metal.

13. A slide-type fastening device for securement with a stud or the like comprising, a support-like base member and a resilient locking member adapted for detachable connection with said base member, said base member having an opening for receiving a stud therethrough and a pair of oppositely disposed shoulder portions extending lengthwise on opposite sides of said opening, said shoulder portions being curved in a lengthwise direction outwardly and upwardly in a general direction away from said opening, said locking member including a body having a slot extending lengthwise thereof and a pair of oppositely disposed resilient arms extending laterally outwardly from said body and adapted for snap-fastening gripping engagement with the associated shoulder portions on said base member, said resilient arms being disposed for sliding and retaining co-acting engagement with said shoulder portions upon lengthwise shifting movement of said locking member with respect to said base member.

14. A slide-like fastening device in accordance with claim 13, wherein said base member includes an inclined planar section disposed adjacent the end remote from said shoulder portions, said inclined planar section extending downwardly and outwardly, and said locking member including a downwardly extending resilient cam means disposed adjacent the end of the body of said locking member remote from said arms.

15. A slide-like fastening device in accordance with claim 13, wherein said base member includes a curved surface section disposed intermediate said shoulder portions, said curved surface section curving from substantially the mid-portion of the body of said base member to a point adjacent the edge of one end of said body.

16. A fastening device in accordance with claim 13, wherein said shoulder portions are provided with lug means adjacent their lower ends adapted for limiting the movement of said locking member in one direction.

17. A slide-like fastening device in accordance with claim 13, wherein said locking member at the end adjacent said arms includes an upwardly extending flange adapted for tool engagement.

18. A slide-like fastening device in accordance with claim 13, wherein the opening in said base member has a greater maximum transverse dimension adjacent the bottom surface of said base member than that adjacent the top surface of said base member.

19. A fastening device in accordance with claim 13, wherein the bottom surface of said base member includes an endless flange extending around the periphery of said base member.

20. A slide-like fastening device in accordance with claim 13, wherein said locking member includes a pair of spaced, oppositely disposed, upwardly extending wings adjacent the end of said locking member remote from said arms adapted for tool engagement.

21. A slide-like fastening device in accordance with claim 13, wherein said locking member includes an aperture disposed remotely from said slot and a slit communicating said slot with said aperture.

22. A slide-like fastening device in accordance with claim 13, wherein said base member is composed of a polymeric material and said locking member is composed of a metal.

23. A slide-like fastening device in accordance with claim 13, wherein the bottom surface of said base member includes an endless skirt disposed intermediate said opening and the periphery of said base member and in encompassing relation to said opening.

24. A slide-type fastening device in accordance with claim 13, wherein the upper surface of said base member includes a curved surface section adjacent one end, an inclined planar section adjacent the oppositely disposed end and a generally planar section disposed intermediate said curved surface section and said inclined planar section, and wherein said locking member includes a flange disposed adjacent one end of said locking member, an inclined section disposed adjacent the oppositely disposed end of said locking member, and a generally flat section disposed intermediate said flange and said inclined section, said flange being associated with said curved surface section and the inclined section of said locking member being associated with the inclined planar section of said base member.

25. A slide-like fastening device in accordance with claim 13, wherein said opening includes web means adapted for progressive frictional engagement of a stud member.

26. A slide-like fastening device in accordance with claim 25, wherein said web means comprises a pair of oppositely disposed, arcuate recess openings disposed on opposite sides of said opening, said openings extending partially through the thickness of the body of said base member.

27. A slide-like fastening device in accordance with claim 13, wherein the slot in said locking member includes an enlarged portion and a reduced width portion, and an upwardly crimped edge extending upwardly adjacent the margin of said reduced width portion.

28. A slide-like fastening device in accordance with claim 27, wherein said enlarged portion includes a linearly extending front edge and a pair of linearly extending side edges, said side edges converging in a direction away from said front edge.

29. A slide-like fastening device in accordance with claim 27, wherein said enlarged portion is of a polygonal configuration.

References Cited

UNITED STATES PATENTS

| | | | |
|---|---|---|---|
| 735,618 | 8/1903 | Tannewitz | 85—8.8 |
| 2,574,107 | 11/1951 | Joy | 85—36 |
| 2,798,406 | 7/1957 | Steck | 85—36 |
| 2,983,534 | 5/1961 | Heller et al. | 85—1 |
| 3,217,582 | 11/1965 | Munse | 151—26 |
| 3,273,441 | 9/1966 | Biesecker | 85—1 |

FOREIGN PATENTS

| | | |
|---|---|---|
| 23,218 | 12/1900 | Great Britain. |

MARION PARSONS, Jr., *Primary Examiner.*